(12) United States Patent
Homola

(10) Patent No.: US 6,972,135 B2
(45) Date of Patent: Dec. 6, 2005

(54) TEXTURING OF MAGNETIC DISK SUBSTRATES

(75) Inventor: Andrew Homola, Morgan Hill, CA (US)

(73) Assignee: Komag, Inc., San Jose, CA (US)

(*) Notice: Subject to any disclaimer, the term of this patent is extended or adjusted under 35 U.S.C. 154(b) by 231 days.

(21) Appl. No.: 10/299,028

(22) Filed: Nov. 18, 2002

(65) Prior Publication Data

US 2004/0096705 A1 May 20, 2004

(51) Int. Cl.$^7$ .............................. B05D 5/12; B44C 1/22
(52) U.S. Cl. ........................ 427/130; 427/131; 216/22
(58) Field of Search ........................ 216/22; 427/130, 427/131; 428/900

(56) References Cited

U.S. PATENT DOCUMENTS

| | | | | |
|---|---|---|---|---|
| 5,815,343 A | * | 9/1998 | Ishikawa et al. | 360/97.01 |
| 5,861,349 A | | 1/1999 | Vereschagin et al. | 501/86 |
| 5,916,955 A | | 6/1999 | Vereschagin et al. | 524/495 |
| 6,356,520 B1 | * | 3/2002 | Hanamoto et al. | 369/47.1 |
| 6,533,644 B1 | * | 3/2003 | Horie et al. | 451/36 |
| 6,669,983 B2 | * | 12/2003 | Kagami et al. | 427/130 |

OTHER PUBLICATIONS

"Use of Core–and–Shell and Core Ultradispersed Diamond (Nanodiamond) for Strengthening, Polishing and Lubricating", no date avail.

Vereschagin et al., "Properties of Ultrafine Diamond Clusters from Detonation Synthesis", Diamond and Related Material, 3 (1993) pp. 160–162, no month avail.

Documents downloaded from www.ultradiamondtech.com on May 14, 2002 and Oct. 30, 2002.

Documents downloaded from www.plasmachem.de on Nov. 14, 2002, Oct. 23, 2002 and Apr. 1, 2002.

Dolmatov, "Detonation Synthesis Ultradispersed Diamonds: Properties and Applications", Russian Chemical Reviews, 70(7) 607–626, 2001, no date avail.

Feng, "Microcystalline Diamond Films by Direct Ion Beam Deposition", Diamond and Related Materials, 9 (2000), 872–876, no month avail.

Hughes, "AC Electrokinetics: Applications for Nanotechnology", no date avail.

Spring et al., "Texturing of Disk Media—a Comparison of the Performance of Various Diamond Types", Datatech, no date avail.

Dialog printout dated Jan. 30, 2003.

"Annual Report 1999–2000/Center for Advanced Materials Processing (CAMP)/Clarkson University, Potsdam, NY.", no month avail.

\* cited by examiner

Primary Examiner—Brian K. Talbot

(57) ABSTRACT

A method for texturing a substrate for a magnetic disk comprises abrading the substrate using nano-sized diamond particles (e.g. having a diameter less than or equal to 20 nm). A magnetic layer is then deposited over the substrate. Even when the texture is extremely smooth (e.g. less than about 2.2 ÅRa), the disk still exhibits good Hc and MrT orientation ratios, SNR and PW50.

19 Claims, 6 Drawing Sheets

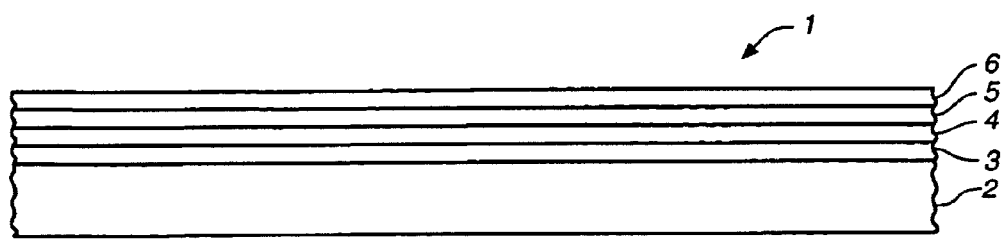
FIG._1
*(PRIOR ART)*
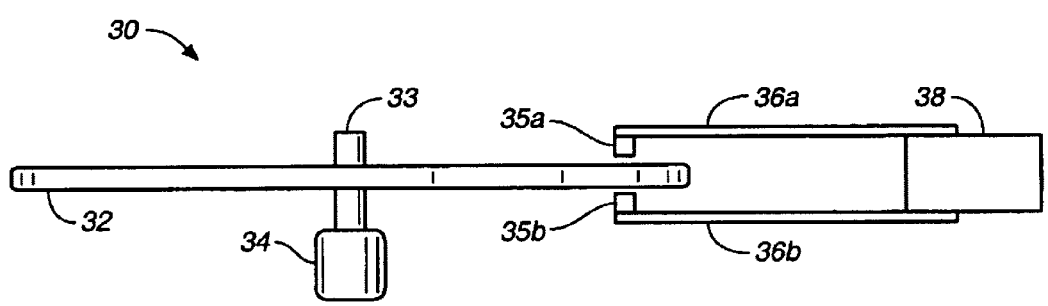
FIG._8

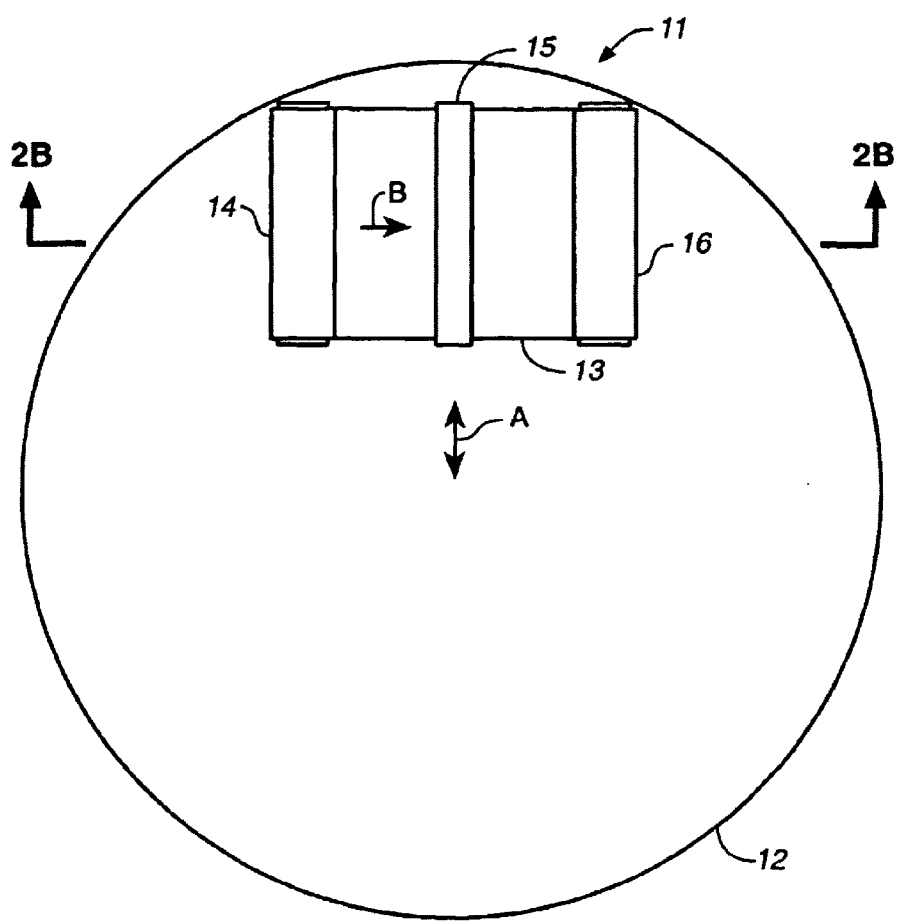
FIG._2A
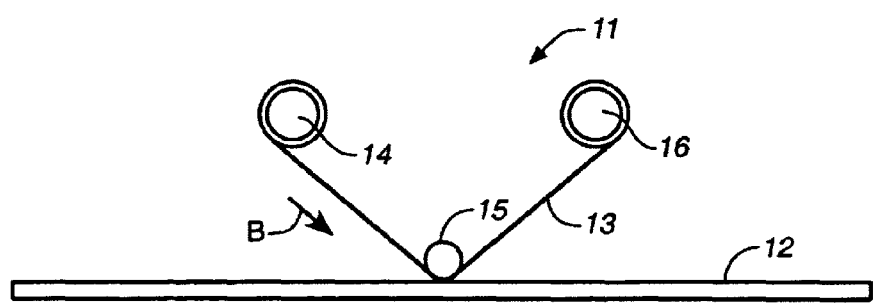
FIG._2B

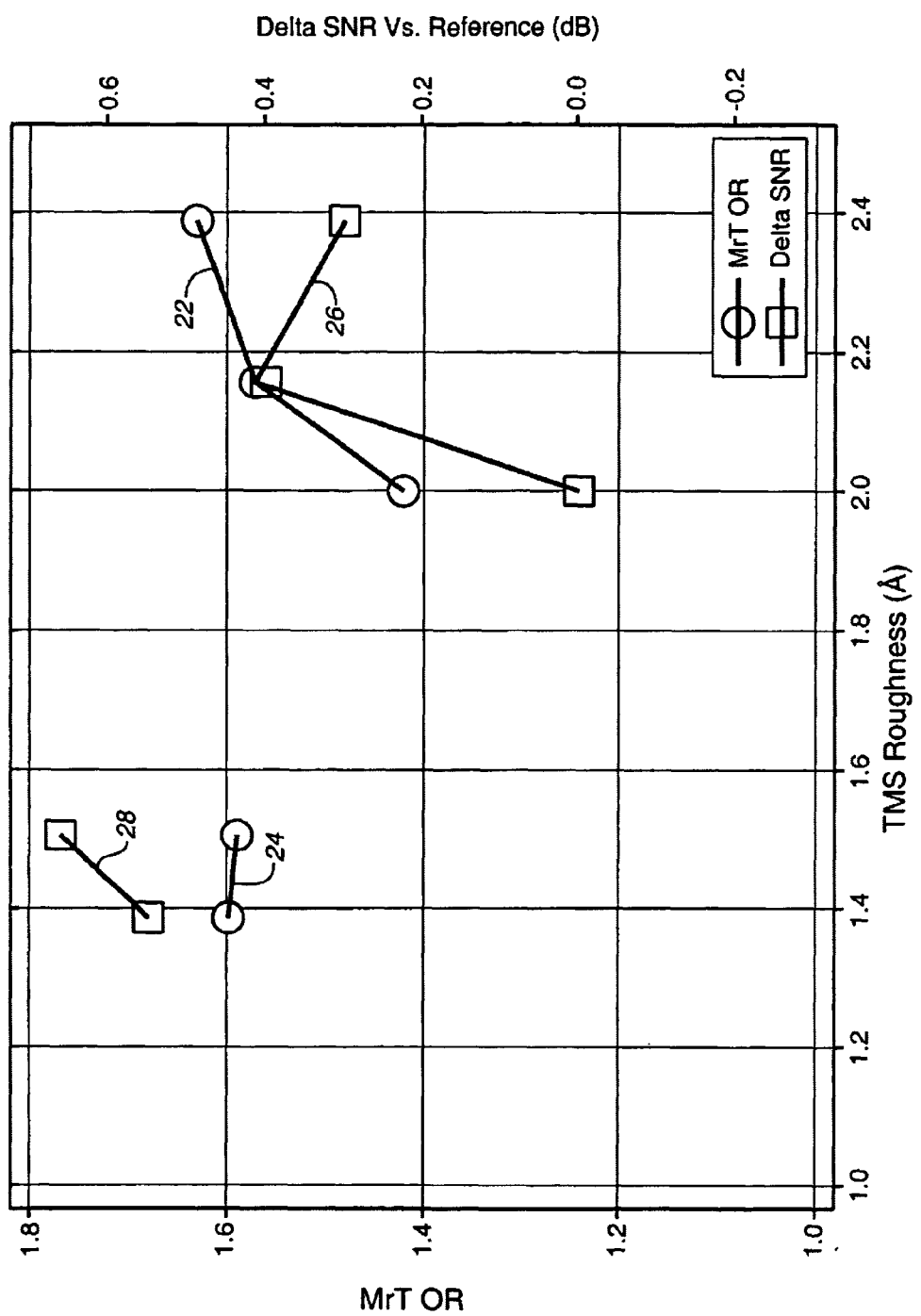
FIG._3

FIG._4A
FIG._4B
FIG._4C
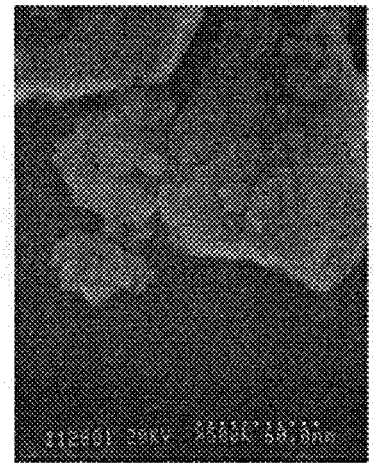
FIG._5A
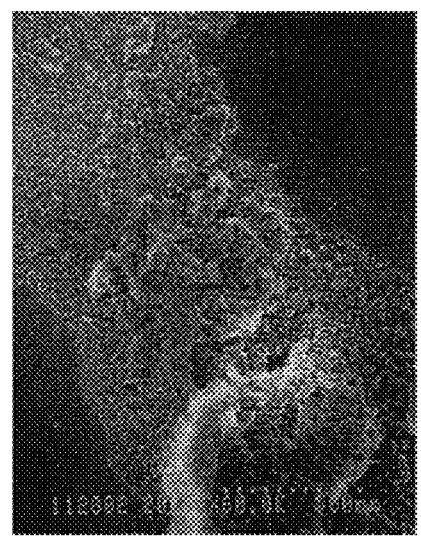
FIG._5B
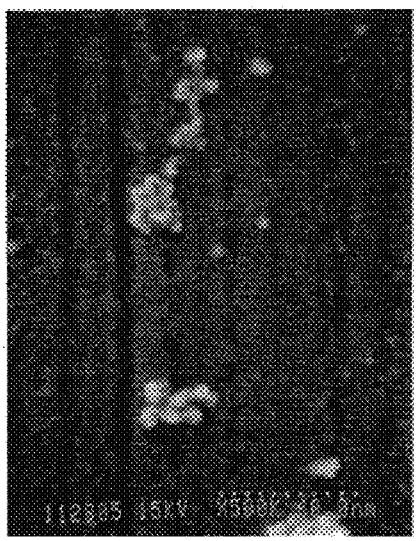

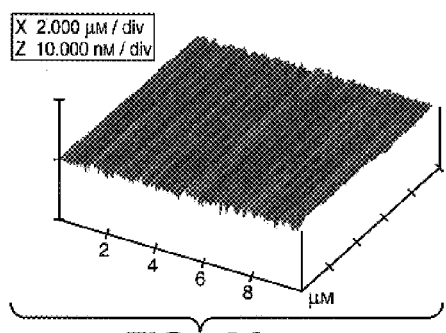
*FIG._6A*
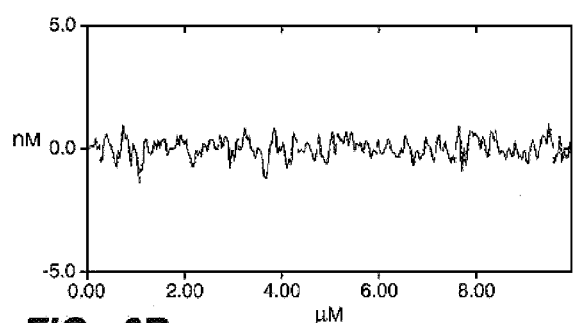
*FIG._6B*
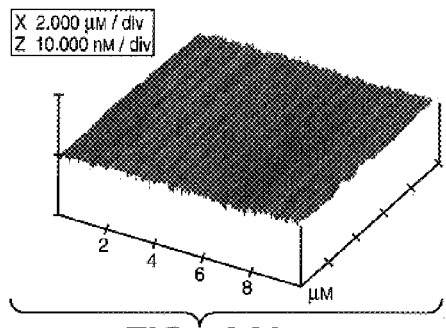
*FIG._6A'*
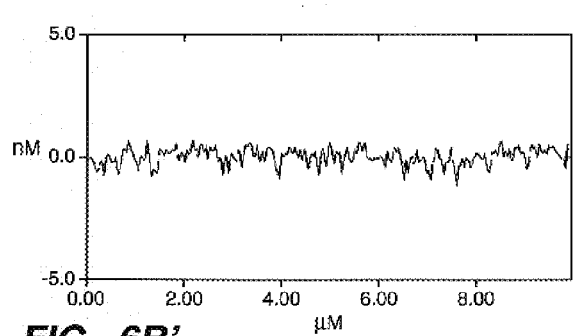
*FIG._6B'*

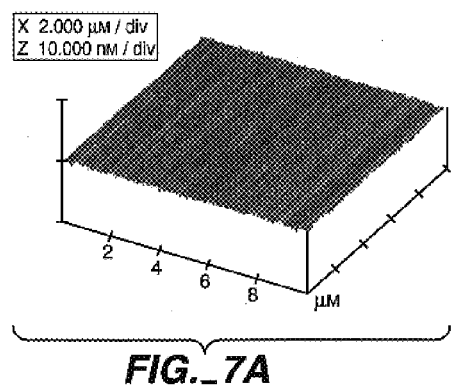
FIG._7A
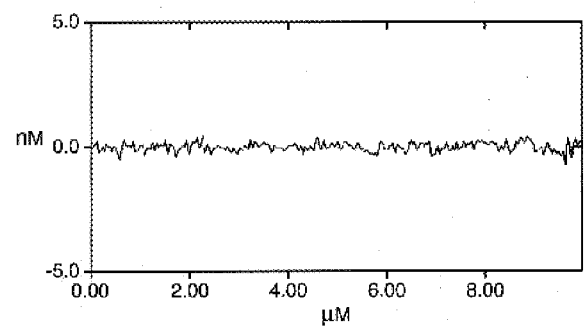
FIG._7B

TEXTURING OF MAGNETIC DISK SUBSTRATES

BACKGROUND OF THE INVENTION

This invention pertains to methods for texturing magnetic disk substrates and the resulting substrates. This invention also pertains to methods for manufacturing magnetic data storage media and the resulting media.

Magnetic disks (e.g. disk 1 of FIG. 1) are manufactured by a) polishing a substrate; b) texturing the substrate; and c) depositing a set of layers on the substrate, e.g. by sputtering or other vacuum deposition technique. The substrate typically comprises an aluminum alloy 2 coated with an electroless-plated nickel phosphorus ("NiP") alloy 3. The layers can comprise one or more seed and/or underlayers 4 (e.g. Cr or a Cr alloy underlayer), one or more magnetic layers 5 (e.g. a Co alloy layer), and one or more protective overcoats 6 (e.g. one or more carbon protective overcoat layers). The texture typically comprises scratches in the circumferential direction (or generally in the circumferential direction) formed using polycrystalline or monocrystalline diamond particles having a size of about 0.05 to 0.5 μm in diameter. The texture typically accomplishes several functions, including facilitating the flying of a read-write head above the magnetic disk. However, more importantly, the texture causes the magnetic characteristics of the disk to become anisotropic. For example, the coercivity Hc of the magnetic layer is higher in the circumferential direction than the radial direction. Also, the magnetic remanence Mr is higher in the circumferential direction than the radial direction.

It has been a trend in magnetic disk manufacturing that disks have been getting smoother and smoother. This is in part because it is necessary to permit the read-write head to fly closer and closer to the magnetic layer. Current disks have a Ra of about 3 to 5 Å as measured by an atomic force microscope ("AFM"). (Ra is a well-known measure of roughness.) Unfortunately, as disks become smoother, and as the Ra drops below 5 Å, the magnetic anisotropy of the disk drops. Further, other magnetic characteristics of the disk are degraded, e.g. the signal to noise ratio ("SNR") and the pulse width PW50.

In prior art diamond texturing, the diamond particles of texturing slurries have highly variable sizes. Because of this, the resulting texture scratches have highly variable sizes (i.e. variable widths and depths). This, in turn, can cause a) magnetic defects (e.g. because the effective flying height between the read-write head and magnetic layer increases at locations where the texture scratches are too deep); and b) reliability problems caused by the fact that deep scratches can make it difficult to passivate the disk. Further, the presence of oversized particles in the texturing slurry results in poor glide characteristics because excessively high ridges can be formed adjacent excessively deep scratches.

SUMMARY

During a method in accordance with the present invention, "nano-sized" particles are used to texture a substrate. The particles are typically diamond, and typically have a diameter less than about 20 nm. In one embodiment, the particle diameters are less than about 10 nm. The particle diameters are typically greater than about 1 nm, and in one embodiment greater than about 2 nm. In one embodiment, they are between 3 and 8 nm. (The word "diameter" as used herein does not require that the particles are spherical.) The particles are typically monocrystalline. In one embodiment, they are used to form scratch lines having a density greater than 50 lines per micron.

After texturing, one or more layers are deposited on the substrate, including a magnetic alloy layer (e.g. a Co or Fe based alloy layer) to thereby form a magnetic data storage medium.

We have discovered that by using "nano-sized particles" (e.g. nano-sized diamond particles) for texturing a magnetic disk we can form extremely smooth textures without sacrificing such magnetic characteristics as anisotropy, SNR and PW50.

In one embodiment, the slurry has generally uniform particle sizes (e.g. between 3 and 8 nm). Because of this, the texture lines formed by the slurry will have uniform widths and depths. This is important because it is desirable to avoid gouges (e.g. to avoid magnetic defect and passivation problems discussed above) and to avoid forming high ridges (e.g. to thereby avoid glide height problems). Further, the nano-sized diamond particles also result in a reduction of large low frequency texture lines. Also, the scratch size and density of scratch lines help one to control the magnetic layer grain size. (It is desirable to form a magnetic layer comprising small uniform grain sizes.)

In one embodiment, the nano-sized particles are free abrasive particles, e.g. within a liquid (for example an aqueous slurry). In another embodiment, the nano-sized particles are fixed abrasive particles, e.g. bound to an abrasive cloth or other structure.

BRIEF DESCRIPTION OF THE DRAWINGS

FIG. 1 schematically illustrates in cross section a prior art magnetic disk.

FIGS. 2A and 2B schematically illustrate in plan view and cross-section apparatus for texturing a magnetic disk substrate.

FIG. 3 illustrates the relationship between MrT OR (the MrT orientation ratio) vs. roughness Ra for disks comprising substrates textured with conventional diamond particles and nano-sized diamond particles. FIG. 3 also illustrates the relationship between SNR and roughness Ra for disks comprising substrates textured with conventional diamond particles and nano-sized diamond particles.

FIGS. 4A, 4B and 4C are SEM photographs of prior art diamond texturing particles.

FIGS. 5A and 5B are SEM photographs of nano-sized diamond particles used during a method in accordance with the present invention.

FIG. 6A is an AFM photograph of a first substrate textured using prior art diamond texturing particles.

FIG. 6B is a cross section AFM scan of the substrate of FIG. 6A.

FIG. 6A' is an AFM photograph of a second substrate textured using prior art diamond texturing particles.

FIG. 6B' is a cross section AFM scan of the substrate of FIG. 6A'.

FIG. 7A is an AFM photograph of a substrate textured using nano-sized diamond texturing particles.

FIG. 7B is a cross section AFM scan of the substrate of FIG. 6A.

FIG. 8 illustrates a magnetic disk drive comprising a disk formed using a method in accordance with our invention.

DETAILED DESCRIPTION

FIGS. 2A and 2B illustrate apparatus 11 for texturing a substrate 12. (Apparatus 11 is not novel in and of itself.) In FIGS. 2A and 2B, a motor (not shown) rotates substrate 12 while a sheet 13 of material (typically nylon) is pushed against substrate 12. (Sheet 13 moves off of a supply reel 14, around a roller 15, and onto a take-up reel 16 (see arrow B).) Roller 15 urges sheet 13 against substrate 12, e.g. with a force between 1 and 10 pounds. In one embodiment, the force is between 2.5 and 5 pounds. A slurry comprising nano-sized diamond particles (described below) is introduced between sheet 13 and substrate 12. Simultaneously, sheet 13 and roller 15 reciprocate, moving back and forth in a direction A. (Alternatively, substrate 12 can reciprocate instead of sheet 13 and roller 15.) The diamond particles form texture scratches that are non-random, and are in a generally circumferential direction in substrate 12. Because of the motion of sheet 13 and roller 15 in the direction of arrow A, the resulting texture exhibits a cross-hatch. (The texture lines therefore intersect, e.g. at an angle between between 0 and 20 degrees, and in one embodiment a range of 2 to 6 degrees, although these values are merely exemplary.) In one embodiment, apparatus 11 is device model no. 1800, available from EDC Corporation located in California. The slurry flow rate is typically between 0.1 and 1 ml/second. The above-described apparatus and parameters are merely exemplary. Other types of texturing apparatus and parameters can also be used.

In one embodiment, the slurry comprises a commercial coolant or lubricant and between 0.4 to 1 gram/liter of diamond particles, e.g. about 0.4 grams per liter of diamond particles. As mentioned above, the diamond particles can have a diameter from 2 and 8 nm.

As mentioned above, the size and spacing of the texture marks depend at least in part on the size of the diamond particles. Using particles having sizes greater than or equal to 2 nm helps ensure a certain minimum grain size in the subsequently formed magnetic layer. (If the grains are too small, their magnetization state may be thermally unstable. However, in other embodiments, diamond particles less than 2 nm in size can be used.)

Description of Types of Nano-Diamond Particles Used with the Invention

In one embodiment, the particles can be formed using a method as described by Vereschagin et al. in U.S. Pat. No. 5,861,349, incorporated herein by reference. Such particles are available from Ultradiamond Technologies, Inc. of Somerville, Mass. (e.g. product no. UD90). Alternatively, the particles can be of the type available from PlasmaChem of Mainz, Germany. They are typically formed at a high temperature and pressure with an explosion. In one embodiment, the diamond particles comprise about 90% or more of diamond, with some ash and/or oxidatable carbon making up the remainder.

Manufacture of a Magnetic Disk Comprising a Substrate Textured Using the Present Invention After texturing, one or more underlayers, magnetic layers and protective overcoats are applied to the disk. In one embodiment, the underlayers and magnetic layers can be as described in U.S. patent application Ser. No. 10/075,123, filed by Bertero et al. and incorporated herein by reference or U.S. Pat. No. 6,150,015, issued to Bertero et al. and also incorporated herein by reference. The overcoat layers can be as described in U.S. patent application Ser. No. 09/604,490, filed by Lairson et al. or German patent document DE 101 30 942 A1, each being incorporated herein by reference. However, the specific processes described by Bertero and Lairson are merely exemplary, and other processes could also be used. For example, other disk manufacturing processes in which one or more ferromagnetic layers (e.g. Co or Fe based magnetic layers) are deposited by a vacuum deposition process (e.g. sputtering) can be used. Also, other types of layers can be deposited on the substrate during the disk manufacturing process.

Properties of a Magnetic Disk Using a Substrate Textured with Nano-Diamond Particles A magnetic disk manufactured using nano-sized diamond particles exhibits several surprising and unique characteristics. As mentioned above, prior to the present invention, substrates were textured using diamond particles having a diameter between 0.05 and 0.5 μm. FIG. 3 illustrates the relationship between the MrT orientation ratio (MrT OR) for disks comprising substrates manufactured using such particles. (MrT equals magnetic remanence times thickness of the magnetic layer.) Curve 22 shows the MrT OR for disks manufactured using diamond particles in accordance with the prior art, whereas curve 24 shows the MrT OR for disks manufactured using nano-sized diamond particles (in this case having diameters between 3 and 8 nm with an average diameter of 5 nm). As can be seen, when using the prior art texturing particles (curve 22), MrT OR dropped precipitously when the Ra dropped below about 2.2 Å. Thus, one skilled in the art, using these particles, would be led to believe that one could not use a Ra less than 2.2 Å without sacrificing MrT OR. However, as demonstrated in curve 24, we have discovered that when using nano-sized diamond particles, one can maintain MrT OR high (e.g. about 1.6) even for Ra's of 1.4 to 1.5 Å. This is an important and surprising discovery.

FIG. 3 also shows that for a magnetic disk textured with the prior art diamond particles, when the Ra dropped below 2.2 Å, the SNR dropped precipitously. (See curve 26.) Surprisingly, when one textures the substrates with nano-sized diamond particles, even at a Ra of about 1.4 to 1.5 Å, the SNR remained high—about 0.45 dB. (See curve 28.) Again, this result was completely unexpected.

FIGS. 4A, 4B and 4C are SEM photographs of prior art diamond texturing particles at 60,000×, 300,000× and 500,000× magnification, respectively, whereas FIGS. 5A and 5B are SEM photographs of nano-sized diamond texturing particles used during a texturing method in accordance with the invention at magnifications of 60,000 and 500,000×, respectively. As can be seen, the prior art particles are larger than the nano-sized particles. Further, there is considerable size variation in the prior art particles, and the prior art particles have numerous jagged and irregular facets. This leads to highly variable and undesirable scratch characteristics.

As mentioned above, FIGS. 5A and 5B are SEM photographs of nano-sized diamond particles used to texture magnetic disks in accordance with the present invention. As can be seen, the particles are small, have roughly the same size. As discussed above, the small size and uniformity of particles permits one to form small, uniform scratch marks.

FIGS. 6A and 6A' are AFM photographs of first and second substrates textured using prior art diamond particles. FIGS. 6B and 6B' are AFM cross section scans of the substrates of FIGS. 6A and 6A', respectively. FIGS. 7A and 7B are an AFM photograph and cross section scan, respectively, of a substrate textured using nano-sized diamond particles. Table I below lists various parameters relating to the surface finish of the substrates of FIGS. 6, 6' and 7.

TABLE I

| | | (Distances in angstroms) | |
|---|---|---|---|
| Substrate | AFM Ra | Distance between mean surface and peaks | Distance between mean surface and valleys |
| FIG. 6A, 6B | 3.9 | 16.8 | 32.0 |
| FIG. 6A', 6B' | 2.8 | 14.9 | 23.9 |
| FIG. 7 | 1.6 | 8.2 | 13.2 |

As can be seen, the scratch lines of the substrate of FIGS. 7A and 7B are shallower and more regular compared to the scratch lines of FIGS. 6A, 6B, 6A' and 6B'. As mentioned above, this has the following advantages: a) the effective flying height of a read-write head with respect to the magnetic layer is reduced; b) there are fewer or no deep gouges for causing magnetic defects; c) the substrate of FIGS. 7A and 7B is easier to passivate; d) there are fewer or no ridges for a read-write head to collide with; and e) the texture grooves of FIGS. 7A and 7B facilitate forming smaller magnetic grains.

In one embodiment, the texture scratch lines formed using a method in accordance with the invention have a density greater than or equal to 50 per micron and less than or equal to 150 per micron. In one embodiment, the scratch density is between about 50 and 120 per micron, e.g. about 80 per micron. (Typically, the minimum scratch density is inversely proportional to the particle diameter, whereas the maximum scratch density is inversely proportional to $\frac{1}{10}$ of the particle diameter.)

Industrial Application

Magnetic disks are incorporated into disk drives, e.g. disk drive 30 of FIG. 8. Referring to FIG. 8, disk 32 is mounted on a spindle 33, which is rotated by a motor 34. A pair of read-write heads 35a, 35b are held on suspensions 36a, 36b, which in turn are mounted on an actuator 38 for moving heads 35a, 35b over the various tracks of disk 32. During use, heads 35a, 35b "fly" above disk 32, and are used to read data from or write data to disk 32. (It will be appreciated that both sides of disk 32 are textured, and the various layers used to manufacture a magnetic disk are formed on both sides of disk 32, although in other embodiments, one can texture and deposit these layers on only one side of disk 32.)

While the invention has been described with respect to specific embodiments, those skilled in the art will appreciate that changes can be made in form and detail without departing from the spirit and scope of the invention. For example, different types of substrates can be textured using the above-described techniques. Thus, the substrate can be an aluminum alloy disk coated with a nickel phosphorus alloy. However, materials other than NiP and aluminum alloys can be used (e.g. glass or glass ceramic substrates), and substrate shapes other than disks can be used (e.g. for media that is not disk-shaped). Different types of texturing apparatuses, with different parameters, can also be used. Different sized particles (e.g. having a size from 0.5 to 20 nm) can be used.

While the method of the present invention can be used to manufacture disks used in longitudinal magnetic recording, the method can also be used to form disks used in vertical recording. (As mentioned above, controlling the scratch sizes can be used to control or influence the magnetic layer grain size. This is useful in both longitudinal and vertical recording.) The method of the present invention can also be used to form isotropic media. While the texturing particles are typically diamond, other hard materials can also be used. Accordingly, all such changes come within the invention.

I claim:

1. A method for manufacturing a magnetic data storage medium comprising:
   texturing a substrate by applying an abrasive against said substrate to form scratches in said substrate, said abrasive comprising bodies of material having a diameter less than 10 nm, said bodies moving relative to one another during said texturing, said texturing resulting in a Ra less than 2.2 angstroms; and
   forming a magnetic layer above said substrate.

2. Method of claim 1 further comprising forming one or more intermediate layers between said substrate and said magnetic layer.

3. Method of claim 1 wherein said bodies have a diameter greater than or equal to 2 nm.

4. Method of claim 1 wherein said scratches cause said magnetic layer to exhibit anisotropic magnetic characteristics.

5. Method of claim 1 wherein said bodies comprise diamond.

6. Method of claim 1 further comprising mounting said substrate with said magnetic layer formed thereon in a disk drive.

7. Method for texturing a magnetic data storage medium substrate comprising abrading said substrate with bodies of abrasive material having a size less than 10 nm to form texture lines, said bodies moving relative to one another during texturing, said texturing resulting in a Ra less than 2.2 angstroms.

8. Method of claim 7 further comprising forming a magnetic layer over said substrate and one or more intermediate layers between said substrate and said magnetic layer.

9. Method of claim 7 further comprising:
   depositing a magnetic layer over said substrate, wherein said bodies are sufficiently small such that the resulting texture provides an MrT OR of said magnetic layer that is greater than or equal to about 1.4 when the Ra of said substrate is less than 2.2 angstroms.

10. Method of claim 9 wherein said Ra of said substrate is greater than 0.5 angstroms and the MrT OR of said magnetic layer is less than 2.2.

11. Method of claim 9 further comprising forming one or more intermediate layers between said substrate and said magnetic layer.

12. A method for manufacturing a magnetic data storage medium comprising:
   texturing a substrate with an abrasive such that the Ra of said substrate is less than 2.2 angstroms, said abrasive comprising bodies of material having a diameter less than 10 nm, said bodies moving relative to one another during texturing; and
   depositing a magnetic layer over said substrate, wherein said particles are sufficiently small such that the resulting texture provides a SNR of said magnetic layer that is at least 1.5 dB higher than it would be if said substrate were not textured.

13. Method of claim 12 wherein the SNR is between 1.5 and 6 dB greater than what the SNR would be if the substrate were not textured.

14. A method for manufacturing a magnetic data storage medium comprising:
   texturing a substrate with an abrasive such that the Ra of said substrate is less than 2.2 angatroms, said abrasive comprising bodies of material having a diameter less than 10 nm, said bodies of material moving relative to one another during texturing; and depositing a magnetic layer over said substrate, wherein said particles are sufficiently small such that the resulting texture provides an SNR of said magnetic layer that does not drop substantially below the value it would have if the Ra were greater than 2.2 angstroms.

15. Method of claim 14 wherein the SNR of the magnetic layer has a value that is not more than about 3 dB above the value it would have if the Ra were greater than 2.2 angstroms.

16. Method of claim 1 wherein said bodies of material have a diameter less than 8 nm.

17. Method of claim 7 wherein said bodies of material have a diameter less than 8 nm.

18. Method of claim 12 wherein said bodies of material have a diameter less than 8 nm.

19. Method of claim 14 wherein said bodies of material have a diameter less than 8 nm.

* * * * *